(12) United States Patent
Gong et al.

(10) Patent No.: US 8,830,395 B2
(45) Date of Patent: Sep. 9, 2014

(54) SYSTEMS AND METHODS FOR ADAPTIVE SCALING OF DIGITAL IMAGES

(71) Applicant: Marvell World Trade Ltd., St. Michael (BB)

(72) Inventors: Yun Gong, Cupertino, CA (US); Dam Le Quang, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/101,918

(22) Filed: Dec. 10, 2013

(65) Prior Publication Data

US 2014/0168511 A1 Jun. 19, 2014

Related U.S. Application Data

(60) Provisional application No. 61/739,428, filed on Dec. 19, 2012.

(51) Int. Cl.
*H04N 7/01* (2006.01)
*H04N 11/20* (2006.01)

(52) U.S. Cl.
CPC ........... *H04N 7/0125* (2013.01); *H04N 7/0135* (2013.01)
USPC ........... 348/441; 348/458; 348/452; 348/448; 348/446; 348/438.1; 348/437.8; 348/581; 348/552; 348/550; 348/508; 348/625; 348/639; 348/646; 348/651; 348/660; 348/700; 348/715; 348/720; 348/354; 348/333.11; 348/273; 348/147; 348/208.13; 348/180; 382/300; 382/299; 382/254; 382/260; 382/263; 382/264; 382/266; 382/276; 382/298; 382/194; 382/199; 345/428; 345/538; 345/660

(58) Field of Classification Search
USPC ........... 348/441, 437.8, 438.1, 446, 448, 452, 348/458, 581, 552, 550, 508, 625, 639, 646, 348/651, 660, 700, 715, 720, 180, 208.13, 348/247, 273, 333.11, 354; 382/299, 300, 382/254, 260, 263, 264, 266, 276, 298, 194, 382/199; 345/428, 538, 660
See application file for complete search history.

(56) References Cited

U.S. PATENT DOCUMENTS

| | | | | |
|---|---|---|---|---|
| 5,650,823 | A * | 7/1997 | Ngai et al. | 375/240.15 |
| 6,847,397 | B1 * | 1/2005 | Osada | 348/273 |
| 7,092,020 | B2 * | 8/2006 | Yoshikawa | 348/280 |
| 7,515,210 | B2 * | 4/2009 | Chow | 348/625 |
| 7,889,395 | B2 * | 2/2011 | Goto et al. | 358/3.27 |
| 8,180,180 | B2 * | 5/2012 | Zhang et al. | 382/300 |
| 8,233,744 | B2 * | 7/2012 | Tezuka | 382/298 |
| 8,456,553 | B2 * | 6/2013 | Hayashi et al. | 348/273 |
| 2004/0032519 | A1 * | 2/2004 | Oda et al. | 348/294 |
| 2005/0157188 | A1 * | 7/2005 | Kubo | 348/241 |

(Continued)

*Primary Examiner* — Jefferey Harold
*Assistant Examiner* — Mustafizur Rahman (57) ABSTRACT

Systems and methods are provided for upscaling a digital image. A digital image to be upscaled is accessed, where the digital image comprises a plurality of pixel values. A first half pixel value is computed for a first point in the digital image based on a plurality of pixel values of the digital image surrounding the first point and an activity level. A second half pixel value is computed for a second point in the digital image, and an interpolated pixel of an upscaled version of the digital image is determined using a plurality of the pixel values, the first half pixel value, and the second half pixel value.

20 Claims, 8 Drawing Sheets

(56) References Cited

U.S. PATENT DOCUMENTS

| | | |
|---|---|---|
| 2006/0039590 A1* | 2/2006 | Lachine et al. ............... 382/128 |
| 2010/0166334 A1* | 7/2010 | Zhang et al. ................. 382/263 |
| 2011/0057933 A1* | 3/2011 | Lyashevsky ................. 345/428 |
| 2012/0229677 A1* | 9/2012 | Ugawa et al. ................ 348/234 |
| 2012/0263384 A1* | 10/2012 | Tezuka ......................... 382/199 |
| 2012/0293695 A1* | 11/2012 | Tanaka ......................... 348/280 |

* cited by examiner

SYSTEMS AND METHODS FOR ADAPTIVE SCALING OF DIGITAL IMAGES

CROSS-REFERENCE TO RELATED APPLICATIONS

The present application claims priority from U.S. Provisional Application Ser. No. 61/739,428 entitled "Adaptive Scaler," filed 19 Dec. 2012, the entirety of which is hereby incorporated by reference.

FIELD

This disclosure is related generally to image processing and more particularly to digital image scaling.

BACKGROUND

As high definition (HD) televisions become more widespread throughout the market, consumer expectations for viewing content at a high definition resolution continue to grow. Viewing content at a standard definition on a high definition television is often viewed as disappointing and undesirable. Unfortunately, a large amount of content to be broadcast was recorded or is stored in standard definition formats. Image up-scaling offers a procedure for interpolating a low-resolution image or video to a higher resolution, offering an opportunity to provide a more pleasing, higher resolution display of content, despite a low resolution source.

SUMMARY

Systems and methods are provided for upscaling a digital image. A digital image to be upscaled is accessed, where the digital image comprises a plurality of pixel values. A first half pixel value is computed for a first point in the digital image based on a plurality of pixel values of the digital image surrounding the first point. First half pixel values are computed by determining whether the first point is a high activity area of the digital image, selecting a first candidate as the first half pixel value when the first point is determined to be a high activity area, and selecting a different candidate as the first half pixel value when the first point is determined not to be a high activity area. A second half pixel value is computed for a second point in the e digital image, and an interpolated pixel of an upscaled version of the digital image is determined using a plurality of the pixel values, the first half pixel value, and the second half pixel value.

As another example, a system for upscaling a digital image includes a computer-readable medium configured to store pixel values of a digital image to be upscaled. A first half pixel calculator is configured to compute a first half pixel value for a first point in the digital image based on a plurality of pixel values of the digital image surrounding the first point, where the first half pixel calculator is configured to compute first half pixel values by determining whether the first point is a high activity area of the digital image and selecting a first candidate or a different candidate as the first half pixel based on whether the first point is a high activity area. A second half pixel calculator is configured to compute a second half pixel value for a second point in the digital image. An interpolated pixel calculator is configured to determine an interpolated pixel of an upscaled version of the digital age using a plurality of the pixel values, the first half pixel value, and the second half pixel value, and a computer-readable medium is configured to store the interpolated pixel.

DETAILED DESCRIPTION

Figure 1:
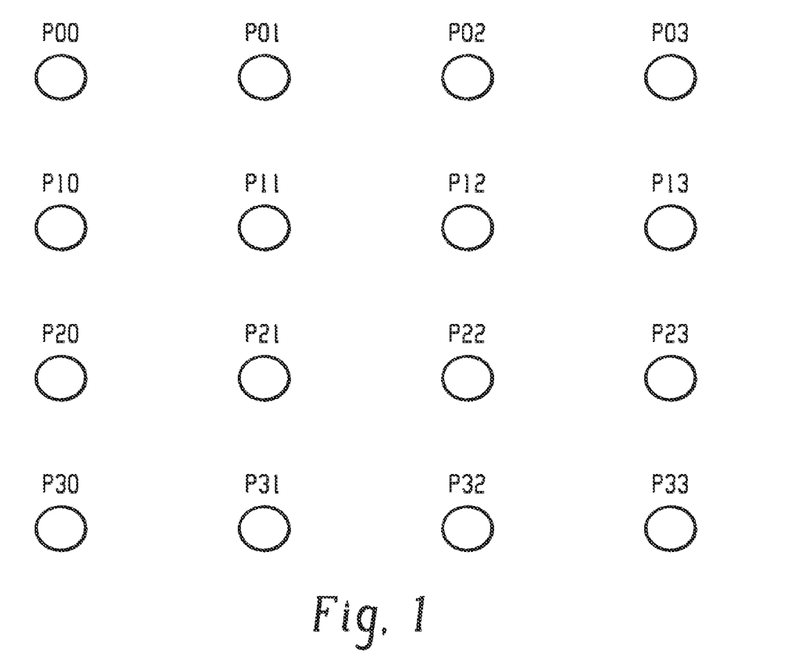
FIG. 1 is a diagram depicting pixels of a digital image to be upscaled.

FIG. 1 is a diagram depicting pixels of a digital image to be upscaled, such as a frame of a standard definition video that is to be upscaled to a higher definition resolution. Each of the pixels P00-P33 is associated with a pixel value that serves as an instruction for lighting a pixel on a display. Such valves are accessed from a computer-readable medium to begin all upscaling process to convert the digital image to a higher resolution. The low definition digital image displayed in FIG. 1 includes sixteen pixels in the area of the digital image depicted. To upscale the digital image to a higher resolution, additional pixels are interpolated in between the sixteen pixels illustrated, so that more pixels can be illuminated in a display when showing the same portion of the digital image. Digital images can be upscaled according to any ratio, including non-integer ratios. For example, a digital image can be upscaled from 256×256 pixels to 3920×2160 pixels, from 130×130 pixels to 721×365 pixels or otherwise.

The process of pixel interpolation provides a best guess at what an appropriate pixel value is for a new pixel being inserted between existing pixels surrounding the new pixel based on information present in the surrounding pixels. Quality interpolation can result in pleasing high resolution images that look comparable to images captured in high resolution. However, poor interpolation can result in unwanted artifacts such as jaggies and blurring.

Figure 2:
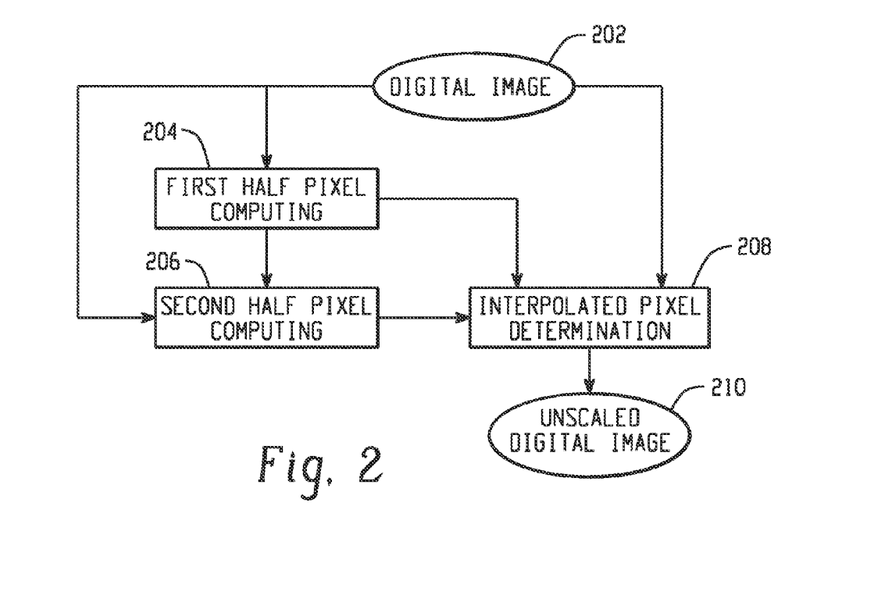
FIG. 2 is a flow diagram depicting a method of upscaling a digital image.

FIG. 2 is a flow diagram depicting a method of upscaling a digital image. A digital image 202 to be upscaled is provided to a first module 204 where values for one or more first half pixels are computed between pixels of the digital image 202 using the pixels of the digital image 202. A second half pixel computing module 206 computes one or more second half pixel values between pixels of the digital image 202 and first half pixel values computed at 204. The second half pixels are computed using the pixels of the digital image 202 as well as the first half pixels computed at 204. The half pixel values reflect the correct interpolation directions based on implicit edge identification by a set of flexible conditions representing local pixel structures. At 208, interpolated pixels to be inserted among the pixels of the digital image 202 are determined to formulate the upscaled digital image 210. The interpolated pixels are determined based on pixels of the digital image 202, first half pixel values computed at 204, and second half pixels computed at 206, such as described further herein.

Figure 3:
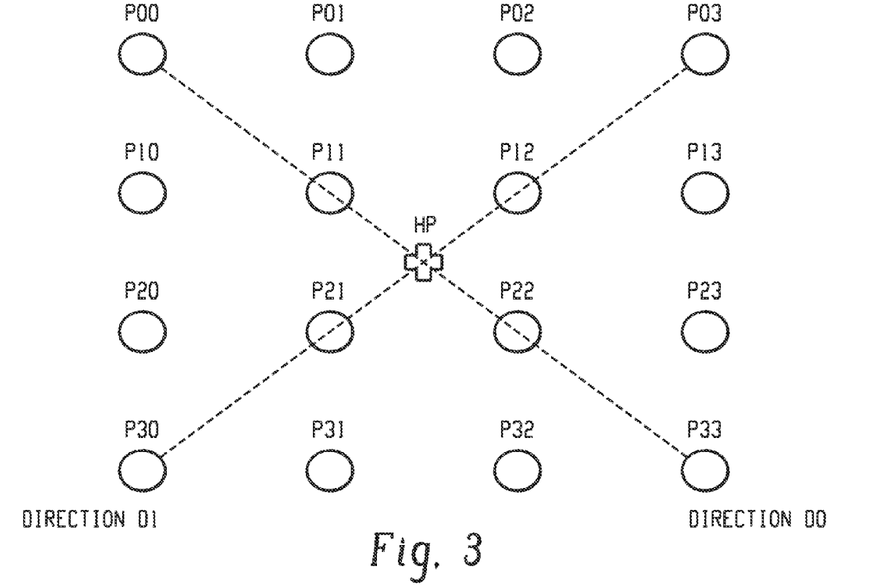
FIG. 3 is a diagram depicting computation of a first half pixel value.

FIG. 3 is a diagram depicting computation of a first half pixel value. A first half pixel value is calculated for each 4×4 block of pixels of a digital image. A position of a first half pixel value is illustrated in FIG. 3 by the cross symbol identified as HP. Additional first half pixels are also computed in the middle of each of the other square groups of four pixels (e.g., P00, P01, P10, P11) based on the sixteen pixel values surrounding those positions.

Figure 4:
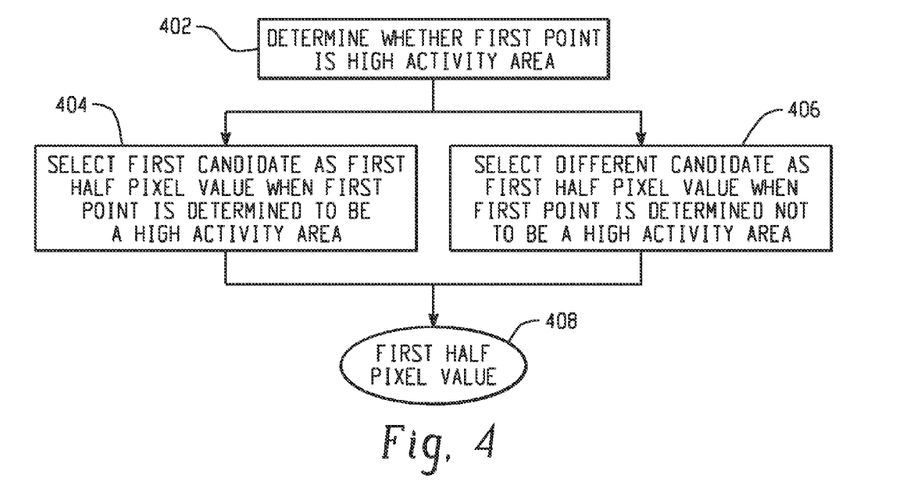
FIG. 4 is a flow diagram depicting a process for computing a first half pixel value at a first point.

FIG. 4 is a flow diagram depicting a process for computing a first half pixel value at a first point (e.g., the pixel value for the position noted as HP in FIG. 3). At 402, a determination is made as to whether the first point is a high activity area, such as an area that appears to include multiple edges or other high frequency pixel data (e.g., using steps 504, 506, 508, 510 of FIG. 5). At 404, when the first point is determined to be a high activity area, a first candidate is selected as the first half pixel value 408. When the first point is determined not to be a high activity area, a different candidate is selected at 406 as the first half pixel value 408.

Figure 5:
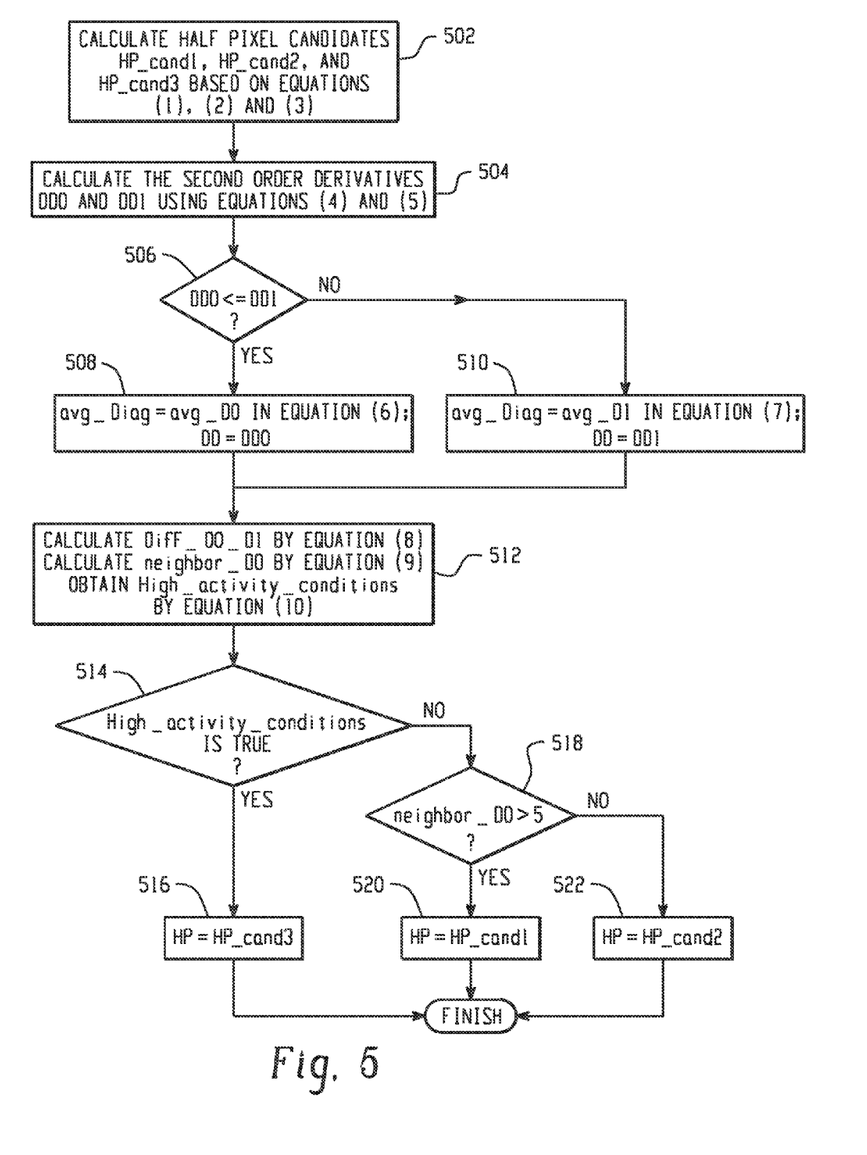
FIG. 5 is a flow diagram depicting an additional process for computing a first half pixel value.

FIG. 5 is a flow diagram depicting an additional process for computing a first half pixel value. At 502, three candidate for a first pixel value for a first point in the digital image are calculated according to equations (1), (2), and (3)

Direction D0:

$$HP\_cand1 = FourTapFilter(P00, P11, P22, P33) \quad (1)$$

Direction D1:

$$HP\_cand2 = FourTapFilter(P03, P12, P21, P30) \quad (2)$$

Horizontal and vertical directions:

$$Vi = FourTapFilter(P0i, P1i, P2i, P3i), i=0,1,2,3$$

$$HP\_can3 = FourTapFilter(V0, V1, V2, V3), \quad (3)$$

where FourTapFilter is a filter that includes the same coefficients of one phase from a 64-phase poly-phase filter.

One of the three candidates (HP_cand1, HP_cand2, HP_cand3) is selected based on local edge info from the surrounding 4×4 pixels, which is inherently detected according to the following calculations. At 504, second order derivatives are calculated in directions D0 and D1 (as indicated in FIG. 3). An edge along one of those directions is indicated if the derivative in one direction is appreciably larger than in the other direction. In high activity areas, edge directions can change frequently from one pixel to the next. Thus, those areas pose the most challenge to an edge-adaptive interpolation method, such that new artifacts may be introduced in an upscaled digital image if those areas are not handled appropriately.

Because of the potential for frequent edge direction changes, instead of using derivatives to identify diagonal edges, the process of FIG. 5 uses the derivatives to detect high activity areas, where a different first half pixel value computation technique is selected for high activity areas. Thus, HP_can3 is selected for high activity areas that are represented by certain conditions of the derivatives and other parameters. For areas that are not determined to be high activity areas, one of HP_can1 and HP_can2 is selected based on the majority of neighboring diagonal directions.

Specifically, in one example, at 504, the second derivatives DD0 and DD1 are calculated according to equations (4) and (5):

$$DD0 = |P00 + P22 - 2*P11| + |P11 + P33 - 2*P22| + |P10 + P32 - 2*P21| + |P01 + P23 - 2*P12| \quad (4)$$

$$DD1 = |P03 + P21 - 2*P12| + |P12 + P30 - 2*P21| + |P02 + P20 - 2*P11| + |P13 + P31 - 2*P22| \quad (5)$$

if DD0≤DD1 at 506, then avg_Diag is set equal to avg_D0 according to equation (6), and DD is set equal to DD0 at 508.

$$avg\_D0 = (P00 + P11 + P22 + P33 + P10 + P21 - P32 + P01 + P12 + p23)/10 \quad (6)$$

If DD1>DD0 at 506, then avg_Diag is set equal to avg_D1 according to equation (7), and DD is set equal to DD1 at 510.

$$avg\_D1 = (P03 + P12 + P21 + P30 + P02 + P11 - P20 + P13 + P22 + P31)/10 \quad (7)$$

At 512, a magnitude of differences between the two second derivatives is calculated by equation (8) along with an identification of neighboring diagonal directions by equation (9) and certain other conditions relevant to a determination of whether the point is a high activity point in equation (10):

$$Diff\_D0\_D1 = |DD0 - DD1|; \quad (8)$$

$$neignbor\_D0 = (|P00 - P11| <= |P01 - P10|) + \quad (9)$$
$$(|P01 - P12| <= |P02 - P11|) + (|P03 - P12| <= |P02 - P13|) +$$
$$(|P10 - P21| <= |P11 - P20|) + (|P11 - P22| <= |P12 - P21|) +$$
$$(|P12 - P23| <= |P13 - P22|) + (|P20 - P31| <= |P21 - P30|) +$$
$$(|P21 - P32| <= |P22 - P31|) + (|P22 - P33| <= |P23 - P32|);$$

$$\text{High\_activity\_conditions} = \quad (10)$$
$$Diff\_D0\_D1 < TH \,||\, Diff\_D0\_D1 * ratio1 < DD \,||$$
$$(DD > avg\_Diag \,\&\&\, Diff\_D0\_D1 < ratio2 * DD) \,||$$
$$(DD > avg\_Diag \,\&\&\, Diff\_D0\_D1 < ratio2 * DD) \,||$$
$$Diff\_D0\_D1 < ratio3 * |HP\_can1 - HP\_cand2| \,||$$
$$neighbor\_D0 \geq t\_low \,\&\&\, neighbor\_D0 \leq t\_high),$$

where TH, ratio1, ratio2, and ratio3, t_low, and t_high are programmable integer values.

When the high activity conditions determination of equation (10) is true at 514, then HP_cand3 is selected at 516, otherwise a different candidate is selected from HP_cand1 and HP_cand2. Specifically, when the neighboring diagonal directions calculated in equation (9) tend in a first diagonal direction (e.g., neighbor_D0>t_high) at 518, then HP_cand1 is selected at 520, where otherwise, HP_cand2 is selected at 522.

Figure 6:
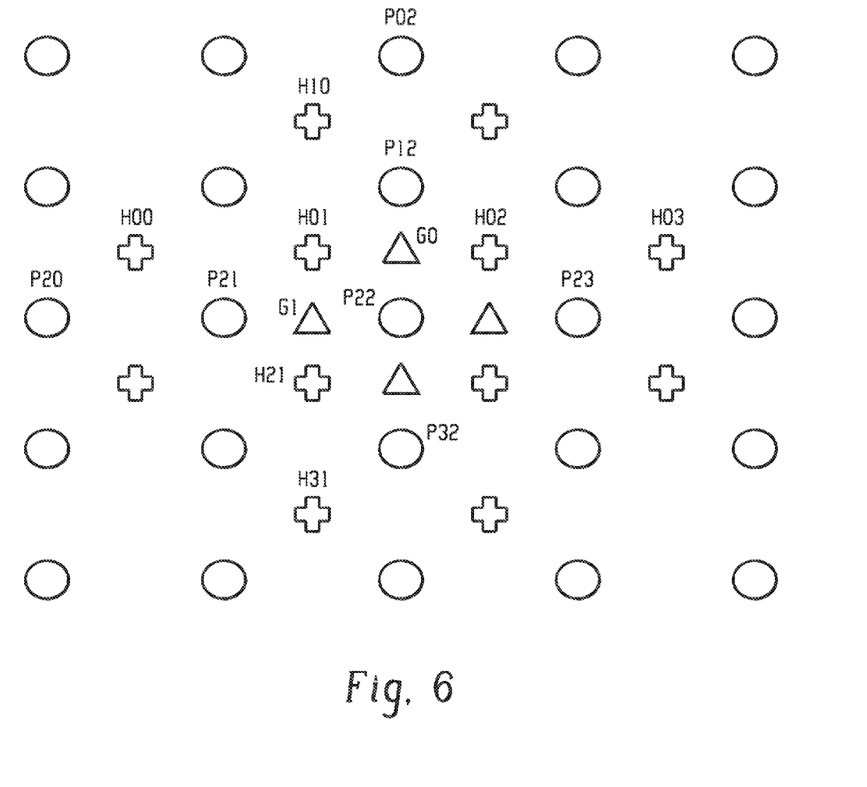
FIG. 6 is a diagram depicting computation of second half pixel values at second points in the digital image.

Following computation of a plurality of first half pixel values, one or more second half pixel values are computed. FIG. 6 is a diagram depicting computation of second half pixel values at second points in the digital image, noted by triangles. Circles represent pixel values of the unaltered, low resolution digital image, while crosses indicate points where first half pixel values have been computed. Second half pixel values are computed for second points that are in line with the pixel value points of the low resolution digital image.

In one example, second half pixel values are computed based on one of: pixel values from the low resolution digital image; and the first half pixel values previously computed in the process. The inputs for computing the second half pixel values are selected based on certain conditions, such as whether the second point is determined to be a high activity area.

Figure 7:
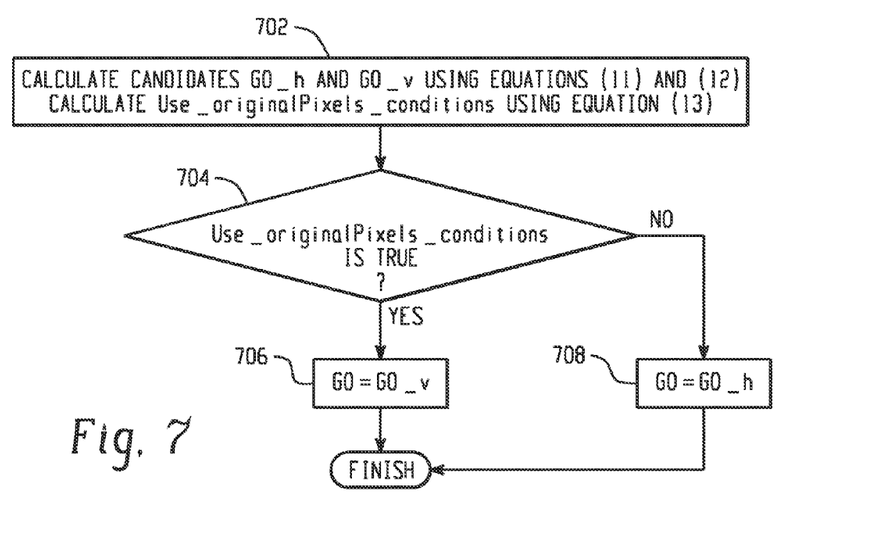
FIGS. 7 and 8 are flow diagrams depicting a process for computing second half pixel values.
Figure 8:
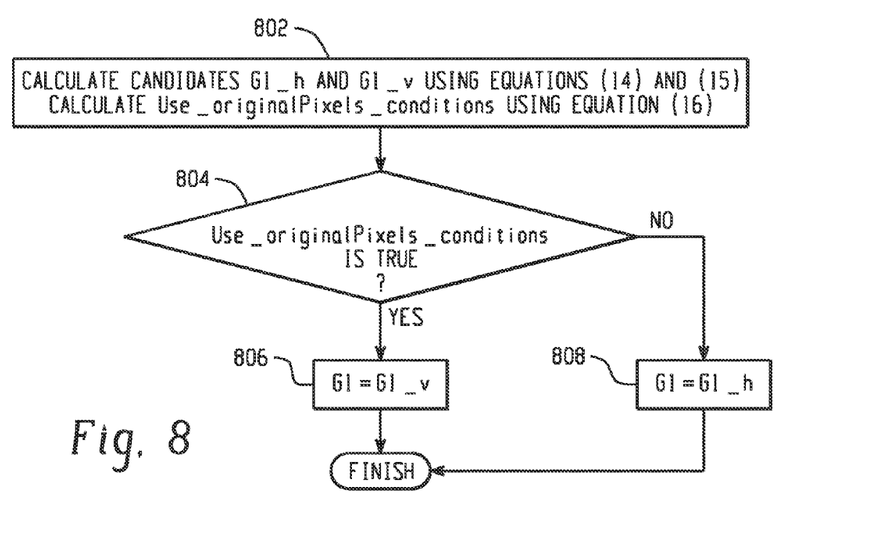

FIGS. 7 and 8 are flow diagrams depicting a process for computing second half pixel values. FIG. 7 depicts a process for computing a second half pixel value for location G0, as shown in FIG. 6. At 702, two candidates for a second half pixel value at G0 are calculated according to equations (11) and (12), where equation (11) calculates candidate G0_b using first half pixel values and equation (12) calculates candidate G0_v using pixel values from the low resolution source digital image.

$$G0\_h = \text{FourTapFilter}(H00, H01, H02, H03) \quad (11)$$

$$G0\_v = \text{FourTapFilter}(P02, P12, P22, P32) \quad (12)$$

Certain conditions for selecting from between the two candidates are further calculated at 702, including whether the second point under consideration is a high activity area, according to equation (13):

Use_originalPixels conditions = (13)

$|P12 - P22| <= (|H01 - H02| + \text{offset}) \parallel H01 \text{ uses HP\_cand3} \parallel$ all four surrounding HP pixels of P22 don't use P22 ∥ all four surrounding HP pixels of P12 don't use P12 ∥

$|G0\_h - G0\_v| > TH$

A selection is made at 706, based on the calculation of equation (13). For a high activity area, candidate G0_v resulting from all original pixels is selected at 708, where G0_h resulting from first half pixel values is selected at 710 otherwise. G0_h is generally a good choice for avoiding jagged diagonal edges, while G0_v tends to excel at maintaining pixel value continuity and avoiding introduction of new artifacts introduced by incorrect edge detection in high activity areas.

FIG. 8 depicts a process for computing a second half pixel value for location G1, as shown in FIG. 6. At 802, two candidates for a second half pixel value at G1 are calculated according to equations (14) and (15), where equation (14) calculates candidate h using first half pixel values and equation (15) calculates candidate G1_v using pixel values from the low resolution source digital image.

$$G1\_h = \text{FourTapFilter}(P20, P21, P22, P23) \quad (14)$$

$$G1\_v = \text{FourTapFilter}(H10, H01, H21, H31) \quad (15)$$

Certain conditions for selecting from between the two candidates are further calculated at 802, including whether the second point under consideration is a high activity area, according to equation (16):

Use_originalPixels conditions = (16)

$|P21 - P22| <= (|H01 - H21| + \text{offset}) \parallel H01 \text{ uses HP\_cand3} \parallel$ all four surrounding HP pixels of P22 don't use P22 ∥ all four surrounding HP pixels of P21 don't use P21 ∥

$|G1\_h - G1\_v| > TH$

A selection is made at 806, based on the calculation of equation (16). For a high activity area, candidate G1_v resulting from all original pixels is selected at 808, where G1_h resulting from first half pixel values is selected at 810 otherwise.

Figure 9:
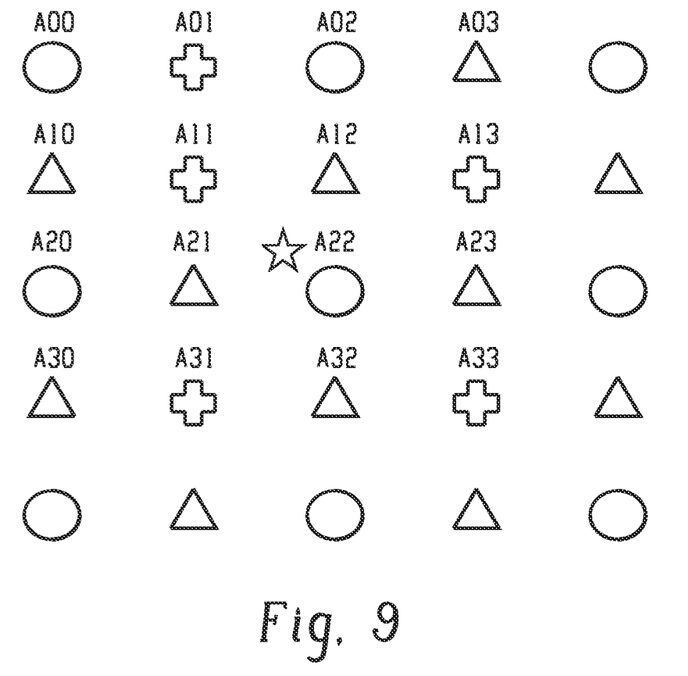
FIG. 9 is a diagram depicting a location for an interpolated pixel in an area of a digital image.

After first half pixel values and second half pixel values have been computed, an interpolated pixel for an upscaled version of the digital image is determined. The required position of an interpolated pixel is based on the change in resolution from the low resolution digital image to the higher resolution image that includes interpolated pixels. FIG. 9 is a diagram depicting a location for an interpolated pixel in an area of a digital image. The position of the new interpolated pixel is indicated with a star, and the new interpolated pixel is positioned at a lower-right phase among pixels/half pixels A11, A12, A21, and A22. The desired interpolated pixel value, FP, at the position indicated by the star in FIG. 9 is determined based on the sixteen pixel/half pixels surrounding the interpolated pixel position A00-A33. The sixteen pixels include four pixels from the low resolution digital image, four first half pixel values, and eight second half pixel values. Using the notation indicated in FIG. 9, the desired pixel value is determined according to equations (17) and (18) as follows:

$$Vi = \text{FourTap32PolyphaseFilter}(A0i, A1i, A2i, A3i, \text{horizontal phase}), i=0,1,2,3 \quad (17)$$

$$FP = \text{FourTap32PolyphaseFilter}(V0, V1, V2, V3, \text{vertical phase}), \quad (18)$$

where horizontal phase indicates the left to right position of the interpolated pixel position between A11 and A12, and vertical phase indicates the top to bottom position of the interpolated pixel position between A11 and A21.

Figure 10:
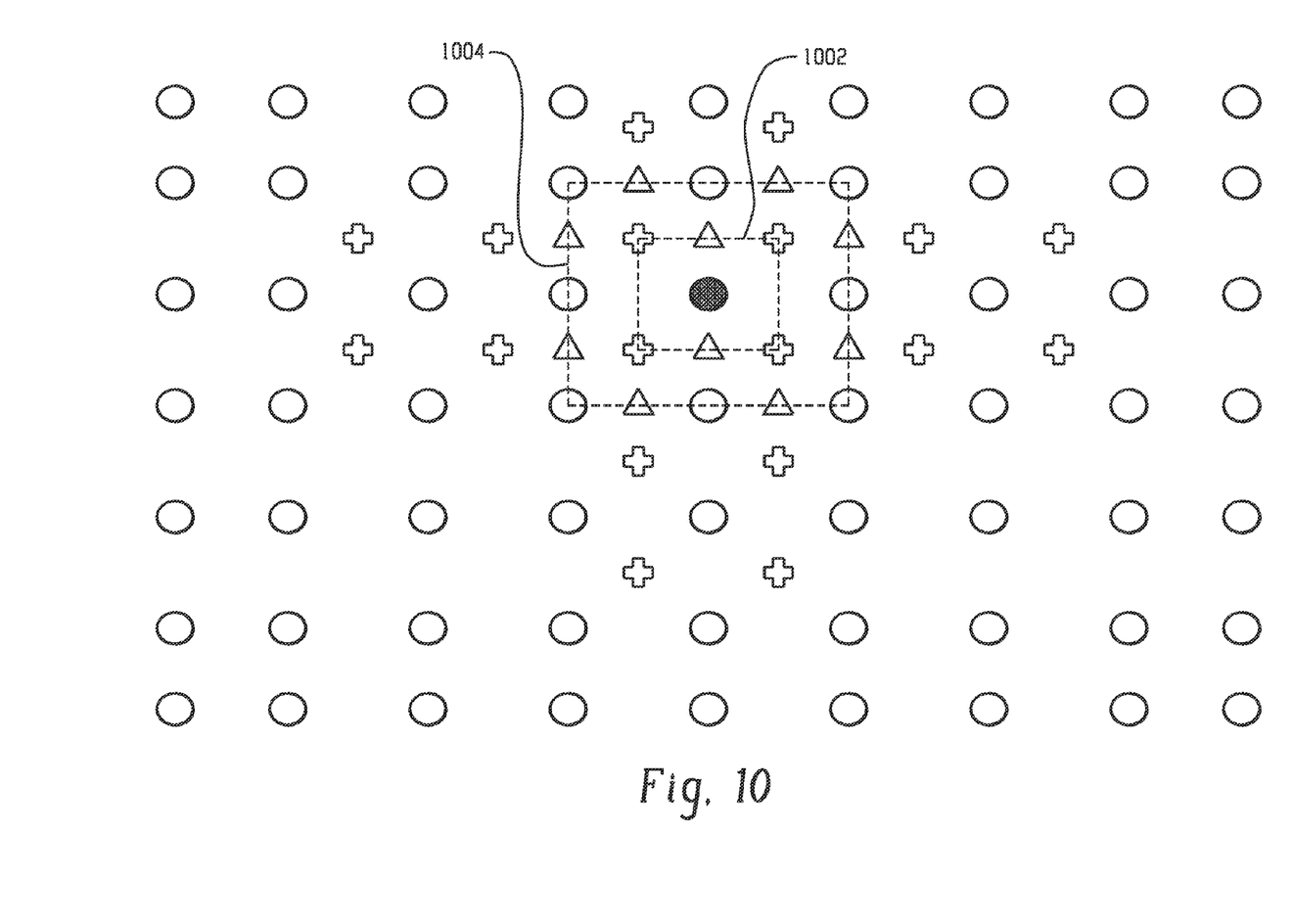
FIG. 10 is a diagram depicting a system implementation.

FIG. 10 is a diagram depicting a system implementation. In one example, seven line buffers are utilized to store the original pixels of an input digital image, and two line buffers are utilized to store previously calculated first half pixels and second half pixels. In FIG. 10, the solid circle is the current pixel from the low resolution digital image. For any scaling factor, a system interpolates pixels values at one or more locations in the first window 1002 around the current pixel. When 4-tap filters are applied in to interpolate a pixel (e.g., as described with reference to FIG. 9), a system utilizes certain of the original and half pixels (5×5) in the second window 1004. In order to compute half pixels in the second window 1004, a system computes neighboring half pixels by performing first half pixel computations, as described herein. Therefore, as shown in FIG. 10, if a system has access to seven lines of the original pixels and two lines of half pixels, the system calculates first half pixels and second half pixels around the solid circle, and then performs a pixel interpolation at a desired position in the first window 1002 using the original pixels and the calculated first and second half pixel values using certain of the 5×5 original and half pixels in the second window 1004. A system can reduce redundant half pixel calculations through utilization of addition line buffer storage.

Figure 11:
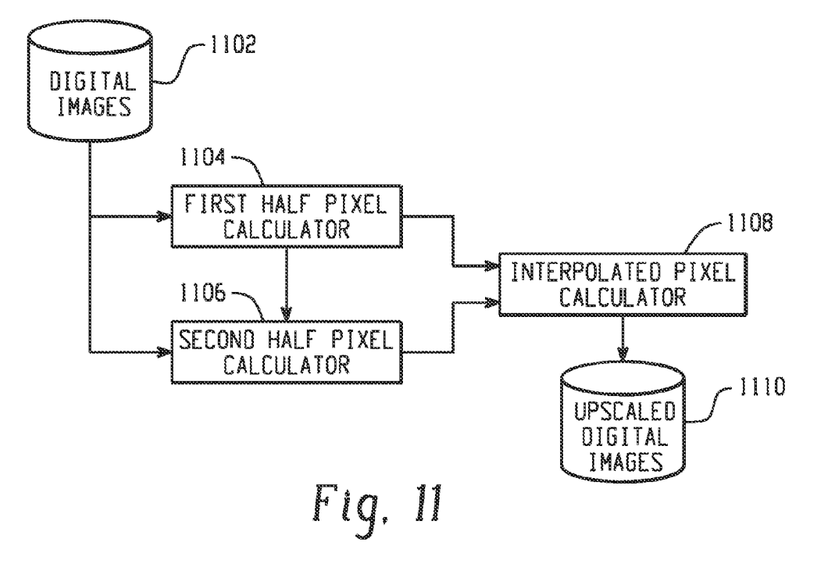
FIG. 11 is a block diagram depicting a system for upscaling a digital image.

FIG. 11 is a block diagram depicting a system for upscaling a digital image. A system includes a computer-readable medium 1102 configured to store pixel values of a digital image to be upscaled. A first half pixel calculator 1104 is configured to compute a first half pixel value for a first point in the digital image based on a plurality of pixel values of the digital image surrounding the first point, where the first half pixel calculator is configured to compute first half pixel values by determining whether the first point is a high activity area of the digital image and selecting a first candidate or a different candidate as the first half pixel based on whether the first point is a high activity area. A second half pixel calculator 1106 is configured to compute a second half pixel value for a second point in the digital image. An interpolated pixel calculator 1108 is configured to determine an interpolated pixel of an upscaled version of the digital image using a plurality of the pixel values, the first half pixel value, and the second half pixel value, and a computer-readable medium 1110 cis configured to store the interpolated pixel.

Figure 12:
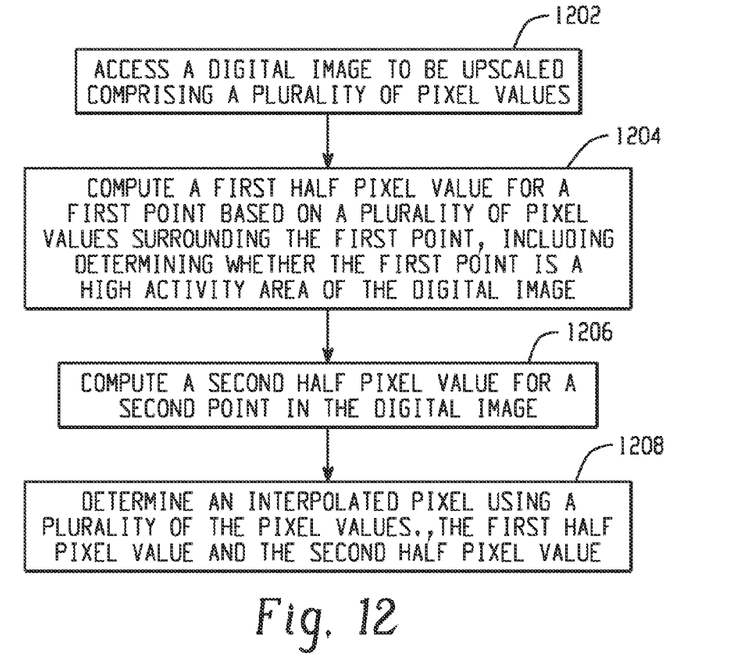
FIG. 12 is a flow diagram depicting a computer-implemented method of upscaling a digital image.

FIG. 12 is a flow diagram depicting a computer-implemented method of upscaling a digital image. At 1202, a digital image to be upscaled is accessed, where the digital image comprises a plurality of pixel values. At 1204, first half pixel value is computed for a first point in the digital image based on a plurality of pixel values of the digital image surrounding the first point. First half pixel values are computed by determining whether the first point is a high activity area of the digital image, selecting a first candidate as the first half pixel value when the first point is determined to be a high activity area, and selecting a different candidate as the first half pixel value when the first point is determined not to be in a high activity area. At 1206, second half pixel value is computed for a second point in the digital image, and at 1208, an interpolated pixel of an upscaled version of the digital image is determined using a plurality of the pixel values, the first half pixel value, and the second half pixel value.

This application uses examples to illustrate the invention. The patentable scope of the invention includes other examples, It is claimed:

1. A method of upscaling a digital image, comprising:
   accessing a digital image to be upscaled, wherein the digital image comprises a plurality of pixel values stored on a computer-readable medium;
   computing a first half pixel value for a first point in the digital image based on a plurality of pixel values of the digital image surrounding the first point, wherein first half pixel values are computed based on an activity level;
   computing a second half pixel value for a second point in the digital image; and
   determining an interpolated pixel of an upscaled version of the digital image using a plurality of the pixel values, the first half pixel value, and the second half pixel value.

2. The method of claim 1, wherein the first half pixel values are computed by:
   determining whether the first point is a high activity area of the digital image;
   selecting a first candidate as the first half pixel value when the first point is determined to be a high activity area;
   selecting a different candidate as the first half pixel value when the first point is determined not to be in a high activity area.

3. The method of claim 1, wherein the interpolated pixel is at a third point that is different from the first point, the second point and any pixels of the digital image.

4. The method of claim 2, wherein determining whether the first point is a high activity area comprises determining a derivative in a first direction, a derivative in a second direction, and comparing the derivative in the first direction with the derivative in the second direction.

5. The method of claim 4, wherein the derivative in the first direction and the derivative in the second direction are second derivatives.

6. The method of claim 4, wherein the first direction is a first diagonal direction, and wherein the second direction is a second diagonal direction that is perpendicular to the first diagonal direction.

7. The method of claim 1, wherein a plurality of first half pixel values are determined and a plurality of second half pixels are determined;
   wherein the interpolated pixel is determined using a plurality of the pixel values, a plurality of first half pixels, and a plurality of second half pixels.

8. The method of claim 7, wherein the interpolated pixel is determined using sixteen pixel values, first half pixels, and second half pixels in total.

9. The method of claim 8, wherein the sixteen pixel values include four first half pixels, eight second half pixels, and four pixels values.

10. The method of claim 2, wherein the first candidate and the different candidate are calculated using one or more input filters.

11. The method of claim 2, wherein the different candidate is selected from one of a second candidate and a third candidate when the point is determined not to be a high activity area;
    wherein one of the second candidate and the third candidate is selected based on differences between pairs of surrounding pixel values.

12. The method claim 11, wherein one of the second candidate and the third candidate is selected based on comparisons of differences between the pairs of surrounding pixels.

13. The method of claim 12, wherein one of the second candidate and the third candidate is selected based on comparisons of differences between pairs of surrounding pixels in the first direction with differences between pairs of surrounding pixels in the second direction.

14. The method of claim 1, wherein computing the second half pixel value for the second point comprises:
    determining whether the second point is a high activity area;
    selecting a non-first half pixel based candidate when the second point is determined to be a high activity area, wherein the non-first half pixel based candidate is calculated without use of any first half pixel values;
    selecting a first half pixel based candidate when the second point s determined not to be in a high activity area, wherein the first half pixel based candidate is calculated based on one or more first half pixel values.

15. A computer-implemented system for upscaling a digital image, comprising:
    a computer-readable medium configured to store pixel values of a digital image to be upscaled;
    a first half pixel calculator configured to compute a first half pixel value for a first point in the digital image based on a plurality of pixel values of the digital image surrounding the first point and an activity level;
    a second half pixel calculator configured to compute a second half pixel value for a second point in the digital image;
    an interpolated pixel calculator configured to determine an interpolated pixel of an upscaled version of the digital image using a plurality of the pixel values, the first half pixel value, and the second half pixel value; and
    a computer-readable medium configured to store the interpolated pixel.

16. The system of claim 15, wherein the first half pixel calculator is configured to compute first half pixel values by determining whether the first point is a high activity area of the digital image and selecting a first candidate or a different candidate as the first half pixel based on whether the first point is a high activity area.

17. The system of claim 15, wherein the interpolated pixel is at a third point that is different from the first point, the second point, and any pixels of the digital image.

18. The system of claim 16, wherein the first half pixel calculator is configured to determine whether the first point is a high activity area based on a first second derivative in a first diagonal direction and a second derivative in a second diagonal direction that is perpendicular to the first diagonal direction.

19. The system of claim 15, wherein the interpolated pixel calculator is configured to determine the interpolated pixel based on a plurality of first half pixel values and a plurality of second half pixel values.

20. The system of claim 15, wherein the second half pixel calculator is configured to compute the second half pixel value for the second point by:
- selecting a non-first half pixel based candidate when the second point is determined to be a high activity area, wherein the non-first half pixel based candidate is calculated without use of any first half pixel values;
- selecting a first half pixel based candidate when the second point is determined not to be in a high activity area, wherein the first half pixel based candidate is calculated based on one or more first half pixel values.

* * * * *